US005720476A

United States Patent [19]

Swann et al.

[11] Patent Number: 5,720,476

[45] Date of Patent: Feb. 24, 1998

[54] REMOVABLE JAW FOR VISE-LIKE WORKHOLDING APPARATUS

[75] Inventors: George R. Swann, Gibsonia; Eric R. Moore, Pittsburgh, both of Pa.

[73] Assignee: Chick Machine Tool, Inc., Warrendale, Pa.

[21] Appl. No.: 596,550

[22] Filed: Feb. 5, 1996

[51] Int. Cl.[6] .......... B23Q 3/06

[52] U.S. Cl. .......... 269/136; 269/134; 269/244

[58] Field of Search .......... 269/136, 134, 269/138, 244, 242, 279, 280, 284

[56] References Cited

U.S. PATENT DOCUMENTS

| | | | |
|---|---|---|---|
| 463,332 | 11/1891 | Giles . | |
| 2,564,138 | 8/1951 | Walker . | |
| 2,880,638 | 4/1959 | Mugglie et al. . | |
| 4,098,500 | 7/1978 | Lenz | 269/136 |
| 4,205,833 | 6/1980 | Lenz | 269/134 |
| 4,221,369 | 9/1980 | Takasugi | 269/138 |
| 4,684,115 | 8/1987 | Krause | 269/136 |
| 4,738,438 | 4/1988 | Horie et al. | 269/136 |
| 4,898,371 | 2/1990 | Mills et al. | 269/136 |
| 4,928,937 | 5/1990 | Bernstein | 269/136 |
| 4,934,674 | 6/1990 | Bernstein | 269/43 |
| 4,971,301 | 11/1990 | Yang | 261/153 |
| 5,024,427 | 6/1991 | Swann | 269/283 |
| 5,033,724 | 7/1991 | James | 269/136 |
| 5,098,073 | 3/1992 | Lenz | 269/136 |
| 5,193,792 | 3/1993 | DiMarco | 269/282 |
| 5,242,159 | 9/1993 | Bernstein | 269/136 |
| 5,458,321 | 10/1995 | Durfee, Jr. | 269/136 |

*Primary Examiner*—Timothy V. Eley
*Assistant Examiner*—Lee Wilson
*Attorney, Agent, or Firm*—Kirkpatrick & Lockhart LLP

[57] ABSTRACT

A removable jaw assembly for a workholding apparatus having a base member with a longitudinal slot therein. The assembly includes a movable support member that has a lower portion operably supportable in the longitudinal slot such that it can be selectively axially moved therein. The movable support member has an upper portion that protrudes from the slot for supporting a jaw member thereon. A jaw retaining member is attached to the upper portion of the movable support member such that it is selectively movable between a first position wherein the jaw member is nonremovably attached to the upper portion of the movable support member and a second position wherein the jaw member can be removed from the upper portion of the movable support member. An actuation member is provided on the base member for biasing the jaw retaining member to the second position when the movable support member is moved to a disengaged position.

8 Claims, 7 Drawing Sheets

REMOVABLE JAW FOR VISE-LIKE WORKHOLDING APPARATUS

BACKGROUND OF THE INVENTION

1. Field of the Invention

The present invention relates to workholding apparatuses and, more particularly, is directed to removable jaws for vise-like workholders.

2. Description of the Invention Background

During the machining of a "workpiece" on a machine tool apparatus such as a milling machine or the like, single or multiple workpieces are typically held in place by a precision vise or clamping member ("a vise-like workholder") that is attached to the machine. Exemplary vise-like workholders that are adapted to hold a single workpiece are disclosed in U.S. Pat. No. 4,928,937 to Bernstein, U.S. Pat. No. 4,898,371 to Mills et al., U.S. Pat. No. 4,569,509 to Good, and U.S. Pat. No. 4,098,500 to Lenz.

As can be gleaned from review of those patents, such vise-like workholders are adapted to clamp a workpiece between opposing jaw members operably supported on a base. Typically, one jaw member is fixed and the other jaw member is movable relative to the fixed jaw member by means of a screw member housed within the base. As the movable jaw member is moved towards the fixed jaw member, the workpiece is clamped therebetween.

Other vise-like workholders are capable of holding two or more workpieces in side-by-side orientations. Examples of such "two-station" workholders are disclosed in U.S. Pat. No. 5,098,073 to Lenz, U.S. Pat. No. 5,094,436 to Stephan, III, U.S. Pat. No. 5,022,636 to Swarm, U.S. Pat. No. 4,934,674 to Bernstein, and U.S. Pat. No. 4,529,183 to Krason et al. Such workholders typically comprise a base that has a central jaw fixed thereto. Two outer jaws are operably supported on the base and can be selectively positioned relative to the fixed central jaw by a vise screw that is operably received in a longitudinal cavity provided in the base.

The workpiece or workpieces are supported on the workholder bases of each of the above-mentioned workholders and are secured in position by at least two jaw members. The jaw members are usually fabricated from a machinable material such as aluminum or the like. In the past, "dedicated" workholders having jaws specially configured to support a particular workpiece were employed. When a particular workpiece was not being machined, the corresponding workholders were stored for future use. Thus, machine shops that fabricated a variety of different workpieces had to store a number of different workholders that were equipped with dedicated workpiece clamping jaws. Such practice often required a substantial investment in workholders and space for storing the workholders when they were not in use.

The above-mentioned problem was somewhat addressed with the advent of workholders equipped with removable jaws. Such workholder arrangement enabled the machinist to utilize a single workholder to machine a variety of different workpieces by equipping the workholder with the appropriate jaws that were configured to clamp the particular workpiece to be machined. Thus, by storing a variety of removable jaws configured to support various workpieces, fewer workholding devices are needed. Because removable jaws are typically much less expensive to fabricate than workholders and they require less storage space, such removable jaw arrangements have reduced the costs typically associated with maintaining a high degree of workholding flexibility.

One type of workholder equipped with a removable jaw is disclosed in U.S. Pat. No. 463,332 to Giles. The removable jaw employed by this workholding device has a socket formed therein with undercut portions adapted to receive a support member having beveled edges. To attach the jaw to the support member, the beveled portion of the support member is aligned with the jaw socket such that it can be inserted therein. Thereafter, the jaw is rotated ninety degrees causing the beveled edges of the support member to engage the corresponding undercut portions of the jaw socket. Because the socket occupies a large portion of the jaw, this removable jaw is ill-suited to have workpiece retaining grooves or cavities machined in its upper surface due to the relatively small amount of material provided between the top of the jaw and the support member socket.

Another workholder that is equipped with removable jaws is disclosed in U.S. Pat. No. 2,564,138 to Walker. This workholder includes jaw support members that each have a camming portion that is adapted to engage a corresponding undercut portion provided on a jaw member. The rear portion of each jaw is also provided with a transverse slot that is adapted to receive a transverse bar formed in a corresponding jaw support member. A second transverse slot is provided in the front portion of each jaw for receiving a corresponding spring strip that is attached to the forward portion of the jaw. The spring strip serves to bias the jaw in a slightly upward direction relative to the jaw support member. This jaw arrangement, however, is less desirable because debris can accumulate in the exposed slot and become lodged between the jaw support member and the jaw as the support member is advanced on the vise base.

Another workholding device that employs a removable jaw member is disclosed in U.S. Pat. No. 2,880,638 to Muggli et al. This removable jaw arrangement includes a jaw "nut" or support member that is adapted to support the removable jaw on a vise base. The removable jaw has a cavity formed therein that is adapted to receive a portion of the jaw nut that protrudes above the work surface of the vise base. The cavity and the jaw nut have corresponding sloping surfaces that are designed to receive a hardened semi-spherical insert positioned therebetween. The insert is retained in that position by an adjusting screw that extends through the rear portion of the jaw to engage a flat surface on the rear of the jaw nut. This arrangement requires the use of hand tools to change the removable jaw and the retaining screw is susceptible to being loosened during the machining process. In addition, there is not sufficient material between the upper surface of the jaw and the cavity to accommodate grooves or retaining cavities in the top of the removable jaw.

U.S. Pat. No. 4,928,937 to Bernstein also discloses a machine vise that has a fixed jaw and a movable jaw. The movable jaw is removably attached to a movable support member in the manner taught in U.S. Pat. No. 2,880,638 to Muggli et al. However, the Bernstein patent teaches that the set screw can be replaced with a spring-biased detent that is designed to engage a cam surface on the movable support member to retain the jaw on the support member. The detent also serves to urge the jaw member into sliding contact with the base. This attachment arrangement permits the jaw to be detached from the jaw support without the use of hand tools. However, due to the relatively small amount of material between the upper surface of the jaw and the cavity therein, such jaw attachment arrangement is ill-suited for use in applications wherein it is desirable to machine workpiece retaining grooves or cavities in the upper surface of the jaw. In addition, each jaw must be fitted with a spring-loaded detent.

Another detachable jaw arrangement for a vise-like workholding apparatus is disclosed in U.S. Pat. No. 5,024,427 to Swarm. This device utilizes a removable pin arrangement for attaching a removable jaw to a jaw support member. Such pin arrangement, however, requires the movable support member to be provided with a relatively high tower portion to accommodate the pin.

Yet another workholding device with detachable jaws is disclosed in U.S. Pat. No. 5,458,321 to Durfee, Jr. The device disclosed in this patent includes a movable jaw support member that is operably supported within a groove in a vise base. A portion of the support member protrudes from the groove in the base and has a transverse groove in one end thereof and a spring biased retaining pin which protrudes from the opposite end thereof. A cavity is provided in the removable jaw member that is sized to receive the movable jaw support member therein. Two transverse pins are provided in the jaw member and are each arranged to engage the transverse groove in the movable support member depending upon how the jaw member is positioned on the support member. A shallow groove or undercut is also provided in the jaw member directly below each transverse pin. To attach the jaw to the support member, the jaw is placed over the support member such that one of the transverse pins engages the transverse groove therein. Thereafter, the jaw is pressed onto the support member such that the spring biased retaining pin engages a corresponding undercut portion located in the jaw. Thus, the jaw is removably secured to the movable member by virtue of the engagement between one of the transverse pins and the transverse groove in the support member and the retaining pin's engagement with one of the undercut portions in the jaw. This jaw arrangement, however, is expensive to fabricate because each jaw must be equipped with transverse pins. In addition, the transverse pins limit the amount of jaw material that can be removed from the upper surface of the jaw to accommodate various workpieces. Also, a separate prybar-like tool must be inserted between the base and the jaw to detach the jaw from the support member.

Thus, there is a need for a removable jaw for a vise-like workholder that is economical to fabricate and store.

There is a further need for a jaw that can be easily attached and detached from a jaw support member without the need for manually operated tools.

There is still another need for a removable jaw member having the above-mentioned attributes that can also accommodate cavities and grooves machined in its upper surface and clamping surfaces to enable the jaw to clamp workpieces having irregular shapes.

There is yet another need for a removable jaw member for use with a workholding device that can be selectively attached to the workholder in a plurality of positions to enable different workpieces to be retained thereby.

SUMMARY OF THE INVENTION

In accordance with a particular preferred form of the present invention, there is provided a removable jaw assembly for use in connection with a vise-like workholder that has a base with a longitudinal slot therein. The removable jaw assembly comprises a movable support member that has a lower portion that is operably supportable in the longitudinal slot of the base such that an upper portion of the support member protrudes from the slot for supporting a jaw member thereon. A jaw retaining member is attached to the upper portion of the movable support member and is selectively movable between a first position wherein the jaw member is non-removably attached to the upper portion of the movable support member and a second position wherein the jaw member can be removed from the upper portion of the movable support member. The jaw assembly also includes an actuation member on the base for biasing the jaw retaining member to the second position when the movable support member is moved to a disengaged position.

Thus, it is an object of the present invention to provide a relatively inexpensive removable jaw assembly that can be used in connection with a vise-like workholder.

It is another object of the present invention to provide a removable jaw assembly that can be easily attached and detached from the workholder without the use of tools or additional equipment.

Yet another object of the present invention is to provide a removable jaw assembly in which various workpiece-compatible cavities and grooves may be machined therein.

Further, it is an object of the present invention to provide a removable jaw assembly that may be attached to a vise-like workholder in at least two different orientations.

Accordingly, the present invention provides solutions to the problems discussed above. In particular, the present removable jaw assemblies can be easily manually attached to and detached from movable support members operably supported in a workholder base without the use of tools. The jaws are attached by low-profile tower arrangements that permit cavities and grooves to be machined into the top surfaces thereof to create clamping surfaces for supporting various workpiece configurations. Therefore, the subject removable jaw assembly addresses a number of problems commonly encountered when using other known workholder jaw arrangements. These and other details, objects and advantages will become further apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
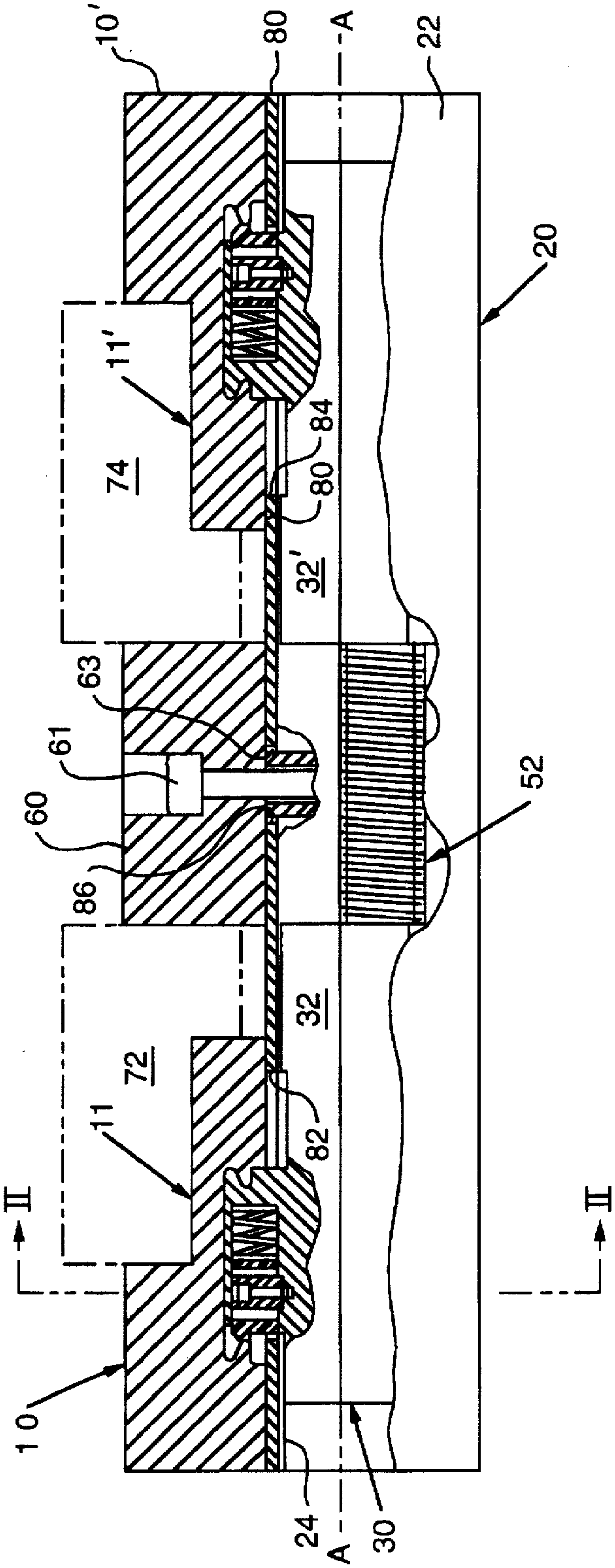
FIG. 1 is a partial cross-sectional view of two preferred removable jaw members of the present invention attached to a two-station vise-like workholding device.

Referring now to the drawings for the purposes of illustrating present preferred embodiments of the invention only and not for purposes of limiting the same, FIG. 1 illustrates preferred removable jaw members (10, 10') of the present invention received on the base 22 of a vise-like workholder 20. The basic structure of the workholder 20 is similar to the workholding apparatus described in U.S. Pat. No. 5,022,636, issued Jun. 11, 1991 to George R. Swann, entitled "Workholding Apparatus", the disclosure of which is herein incorporated by reference. As such, in the present "Detailed Description Of Preferred Embodiments", the basic structure of the workholder 20 will be described in general terms, it being understood that the particular details of the workholder 20 construction, with the exception of those features which are described hereinbelow forming these embodiments of the present invention, may be gleaned from a review of that patent. In addition, the skilled artisan will readily appreciate that the workholders described herein are provided as examples of the types of workholders with which the removable jaw member embodiments of the present invention may be used. As such, the particular construction of the workholders described herein should not be construed to limit the breadth of protection afforded to the present removable jaw member embodiments described herein and recited in the claims hereof.

The vise-like workholder 20 generally comprises a base member 22 which is an elongated metallic structure typically fabricated from a high strength aluminum material. As can be seen from reference to FIGS. 1 and 2, a cavity 24 is machined along the longitudinal axis "A—A" of the base member 22 and defines a longitudinal slot 26 having two longitudinally extending side rail members 28. In addition, a free-floating clamping assembly, generally designated as 30, is provided for movement within the cavity 24 in the base member 22. The clamping assembly 30 includes a first movable support member 32 and a second movable support member 32' which are each slidably received within the cavity 24. As shown in FIG. 1, a first jaw member 10 is preferably removably attached to the first movable support member 32 and a second jaw member 10' is preferably removably attached to the second movable support member 32'.

The clamping assembly 30 also includes a screw shaft 52 that is received within the cavity 24 in the base member 22. One end of the screw shaft 40 is provided with threads which are intended to engage a threaded bore 41 within the first movable support member 32. In addition, the screw shaft 52 includes means (not shown) for engaging and displacing the second movable support member 32'. The screw shaft 52 passes through the second movable support member 32' while the other end of the screw shaft 52 has a socket therein (not shown) for selectively providing rotary motion to the screw shaft 52.

A center jaw member 60 may also be attached to the base 22 between the first and second movable support members (32, 32') preferably by capscrews 61. See FIG. 1. In particular, threaded bores (not shown) are provided in the rails 28 of base 22 for receiving the capscrews 61 therein. Preferably, bushings 63 are attached to base 22 such that one bushing 63 is coaxial with a corresponding threaded bore adapted to receive a capscrew 61. The center jaw member 60 may also be attached to base 22 by the method and apparatus taught in co-pending U.S. patent application Ser. No. 08/300,375, entitled "Apparatus For Positioning An Element On A Surface," filed on Sep. 9, 1994, and owned by the owner of the present application, the disclosure of which is also incorporated herein by reference. However, other precise fastening methods may also be used to attach the central jaw member 60 to the base 22.

As can be seen in FIG. 1, the center jaw member 60 is preferably arranged on base 22 such that the first and second movable support members (32, 32') may move toward and away from the center jaw member 60 to cause workpieces 72 and 74 to be clamped between the center jaw member 60 and first and second jaw members (10, 10'). For example, when the screw shaft 52 is rotated, the first movable support member 32 is moved relative to the center jaw member 60, thereby causing the first jaw member 10 to move toward the center jaw member 60 to clamp a first workpiece 72 therebetween. In addition, the rotation of the screw shaft 52 and its movement relative to the first movable support member 32 causes the second movable support member 32' to move toward the center jaw member 60 to clamp a second workpiece 74 between the jaw members (60, 10').

Figure 2:
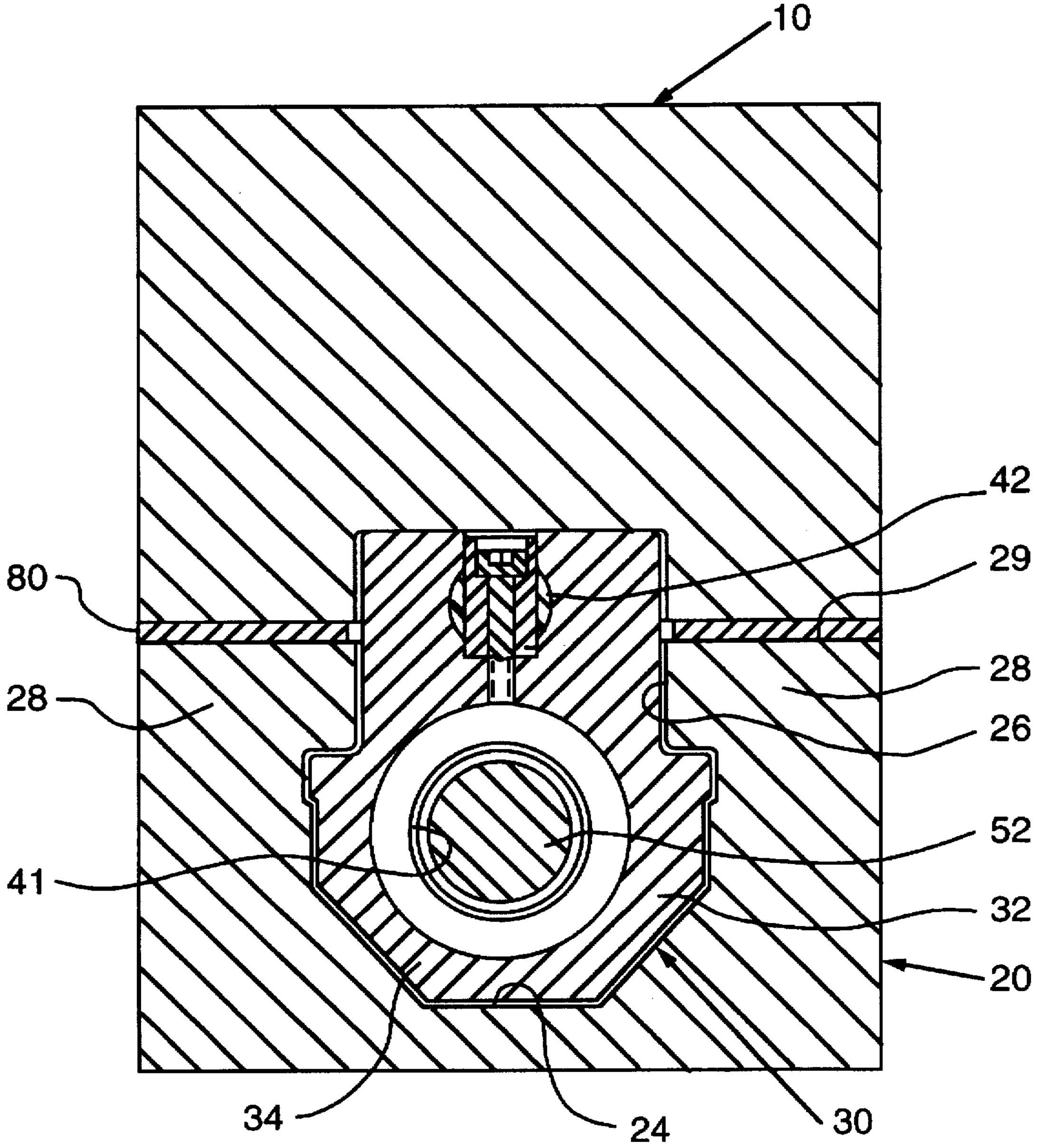
FIG. 2 is a cross-sectional end elevational view of the device depicted in FIG. 1 taken along line II—II of FIG. 1.

As can be seen in FIG. 2, the rails 28 of the workholder base 22 define a planar worksurface (that has a slot 26 extending the length thereof), generally designated as 29. In this embodiment, a shield member 80 of the type disclosed in U.S. Pat. No. 5,442,844, issued on Aug. 22, 1995, entitled "Apparatus For Protecting the Internal Elements of a Workholding Apparatus", the disclosure of which is also incorporated herein by reference, is utilized between jaws (10, 60, 10') and the vise base 22 to prevent debris from accumulating in the slot 26. As can be seen in FIG. 1, a preferred debris shield 80 has a first longitudinal opening 82 therein for receiving a portion of movable support member 32 therethrough. Similarly, shield 80 also has a second longitudinal opening 84 for receiving a portion of the movable support member 32' therethrough. Shield 80 also has bores 86 therethrough for receiving corresponding portions of bushings 63 therein.

Figure 3:
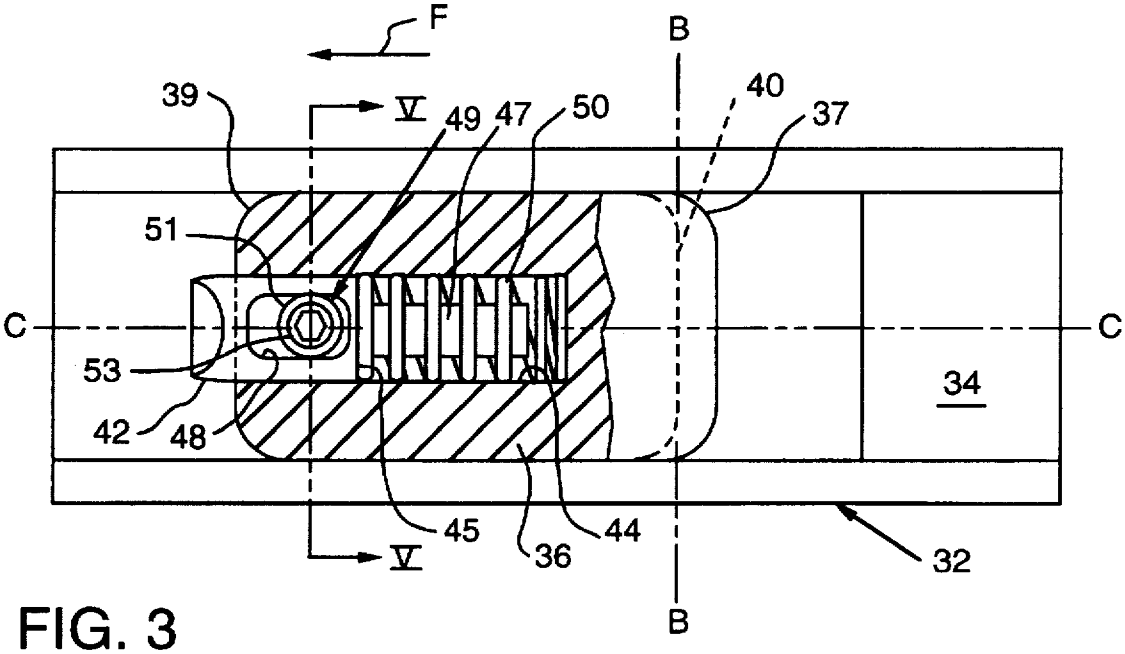
FIG. 3 is a top view of a preferred first movable support member of the present invention with a portion thereof shown in cross-section.
Figure 4:
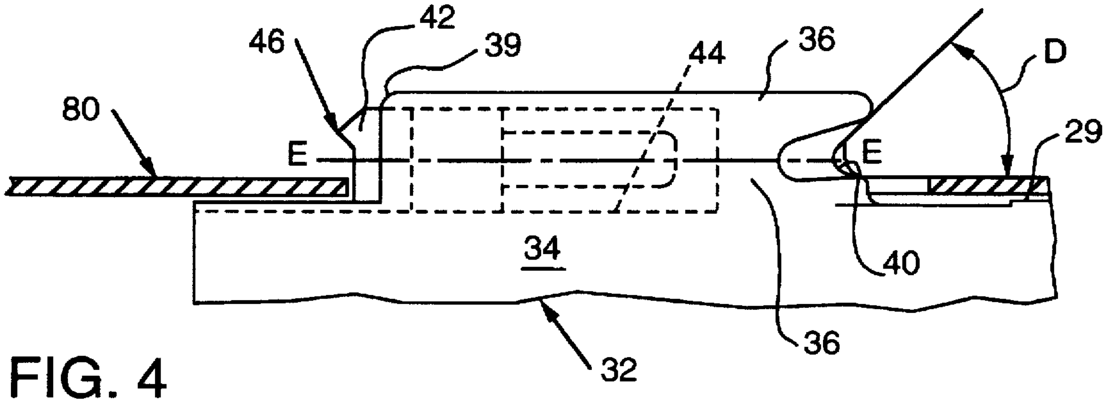
FIG. 4 is a partial side elevational view of the preferred first movable support member of FIG. 3 with a preferred shield member 80 received thereon.
Figure 5:
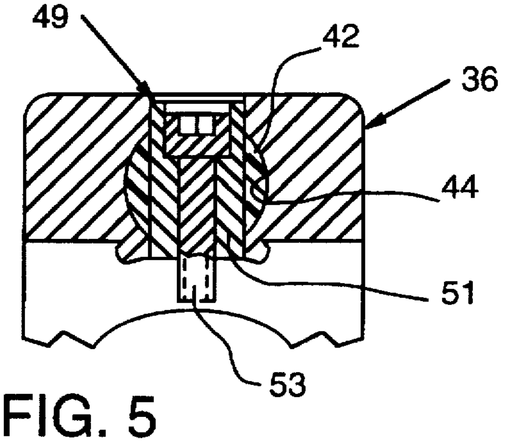
FIG. 5 is partial cross-sectional end elevational view of the first movable support member depicted in FIGS. 3 and 4.

The construction of a preferred first movable support member 32 and corresponding first removable jaw 10 will now be described in detail, with it being understood that the second movable jaw member 10' and the second movable support member 32' are preferably constructed in the same manner. Referring now to FIGS. 3–5, a preferred first movable support member 32 has a longitudinally extending lower portion 34 that is adapted to be slidably received within the cavity 26 of the vise base 22. Support member 32 also has a tower portion 36 that is slidably received in the slot 26 and extends above the worksurface 29. A retaining groove, generally designated as 40, is provided in a first opposing side 37 of the tower 36 such that it extends along an axis "B—B" that is substantially transverse to a longitudinal axis "C—C" of the first support member 32. See FIG. 3. In a preferred embodiment, the retaining groove 40 is provided at an approximate 45° angle (angle "D" in FIG. 4) relative to the top surface of the support member 32 or shield 80. The skilled artisan will appreciate, however, that other groove configurations may also be successfully used.

Preferably, a second exposing side 39 of the tower 36 that is opposite the end with the retaining groove 40, is provided with a retaining pin 42 that protrudes therefrom. It will be appreciated, however, that other numbers of retaining pins 42 may be successfully employed. As can be seen in FIGS. 3–5, pin 42 is slidably received in a longitudinal bore 44 provided in the tower 36. The axis "E—E" of bore 44 is preferably parallel to axis "C—C" and perpendicular to axis "B—B". Pin 42 is preferably fabricated from bronze; however, pin 42 may be fabricated from a variety of other suitable materials.

As can be seen in FIGS. 3 and 4, pin 42 has a relatively flat bearing end 45 and a notched retaining end 46. In addition, a slot 48 is provided in pin 42 to enable pin 42 to be slidably pinned within the bore 44 by a post assembly 49. Preferably, post assembly 49 comprises a sleeve 51 that is attached to the tower portion 36 by a cap screw 53. Those of ordinary skill in the art will appreciate, however, that a myriad of other fastening arrangements can be employed to slidably retain pin 42 within bore 44.

Also in a preferred embodiment, a spring supporting pin 47 protrudes from the bearing end 45 of the pin 42 for supporting a spring member 50 thereon. Spring member 50 is received within bore 44 to outwardly bias the pin 42 received therein in a direction depicted by arrow "F" in FIG. 3.

Figure 8:
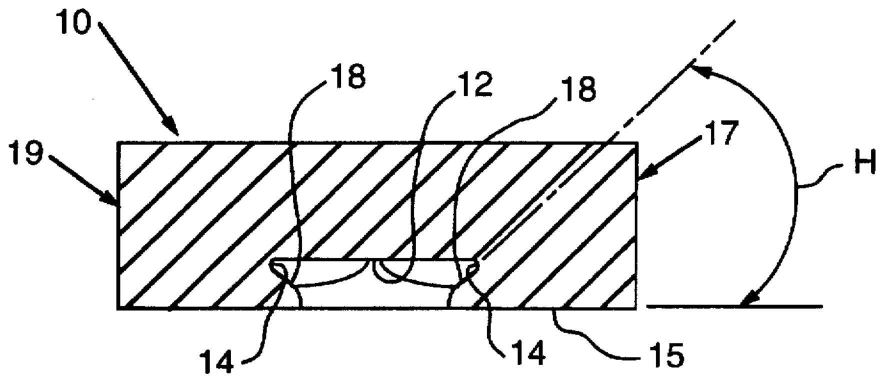
FIG. 8 is a cross-sectional view of the jaw of FIGS. 6 and 7 taken along line VIII—VIII of FIG. 6.
Figure 6:
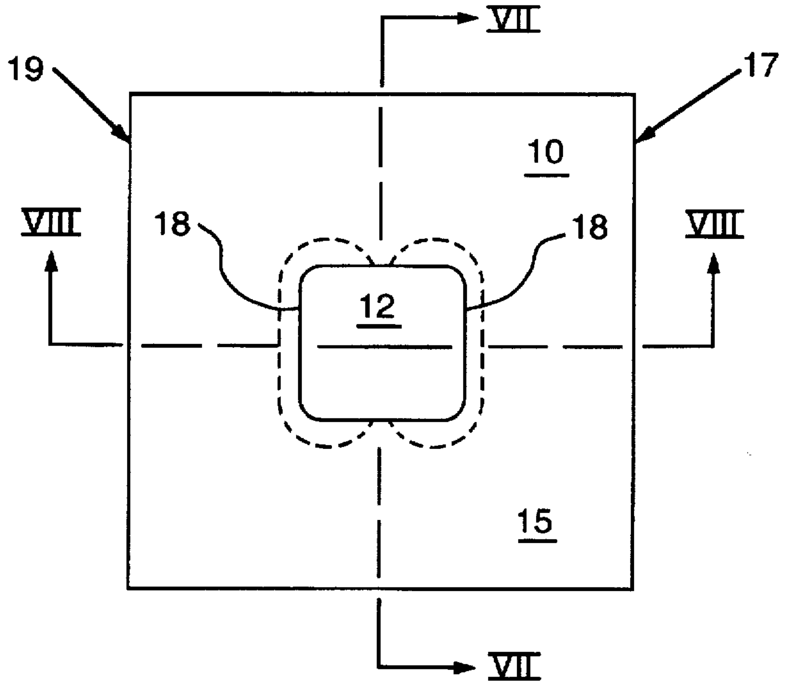
FIG. 6 is a bottom view of a preferred removable jaw member of the present invention.
Figure 7:
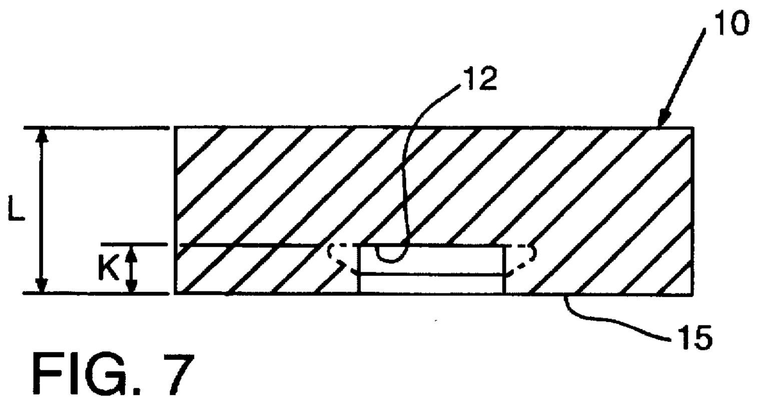
FIG. 7 is a cross-sectional view of the jaw of FIG. 6 taken along line VII—VII of FIG. 6.

FIGS. 6–8 depict a preferred removable jaw member 10. Jaw member 10 is preferably fabricated from aluminum; however, jaw 10 may be fabricated from a variety of other suitable materials such as steel and the like. As can be seen in FIG. 6, jaw member 10 has two clamping surfaces (17, 19) and a bottom surface 15. A cavity 12 having a shape that corresponds to the shape of the tower 36 is also provided in the bottom surface 15 of the jaw member 10. Cavity 12 has opposed undercut portions 14 therein that are machined at an angle "H" relative to the bottom surface 15 of the jaw member 10 that is substantially equal to angle "D" of the retaining groove 40 provided in the tower 36. It will be appreciated that the undercut portions 14 can be machined into the jaw member 10 by a circular cutter utilizing known machining techniques. However, other machining techniques may be utilized to provide the undercut portions 14 in the jaw member 10.

Figure 10:
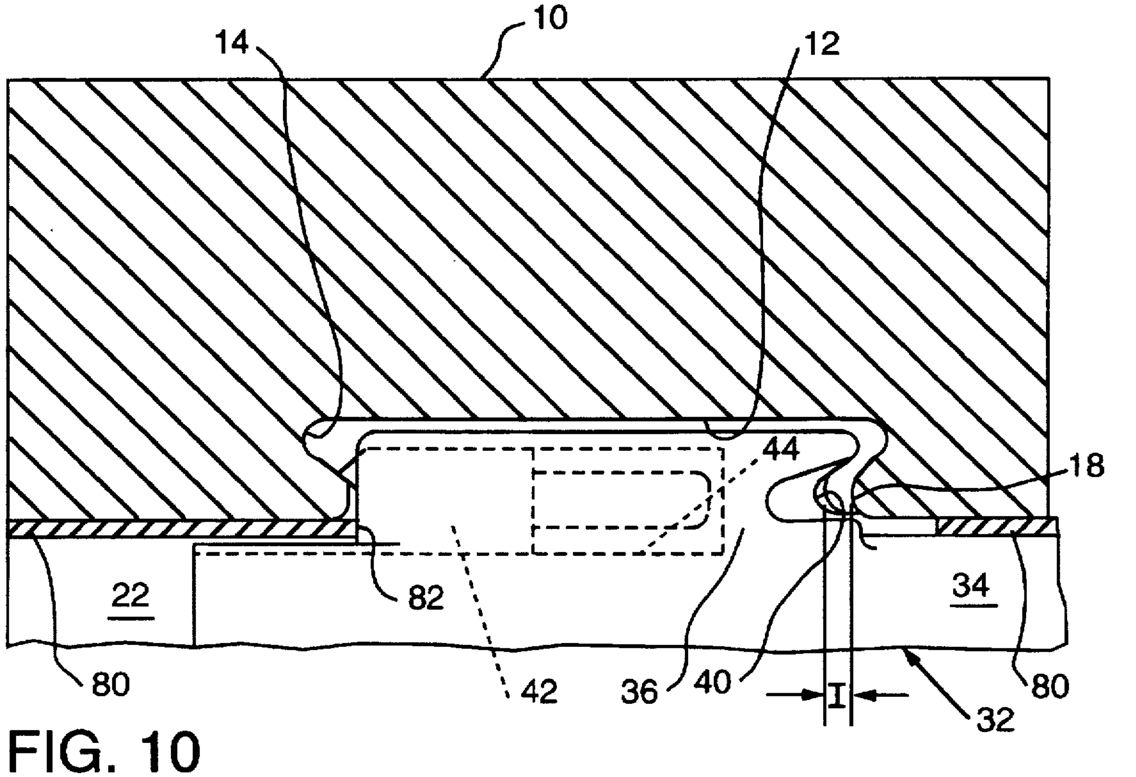
FIG. 10 is a partial cross-sectional assembly view of the preferred removable jaw member and movable support member of FIG. 9 with the retaining pin thereof biased to a second disengaged position.

FIG. 10 illustrates the jaw 10 in a position wherein it can be removed from the tower 36 without the use of any additional tools. To remove the jaw 10 from the tower 36, the movable support member 32 is retracted within the away from the center jaw (the direction represented by arrow "F" in FIG. 3) by rotating the screw member 52 until the edge portion 81 of the opening 82 in the shield member 80 contacts the tower 36 thereby biasing pin 42 into bore 44. When in that "releasable" position, the jaw 10 may be easily manually removed from the tower 36 due to the clearance "I" generated between the groove and the shoulder 18 in the jaw 10.

Figure 9:
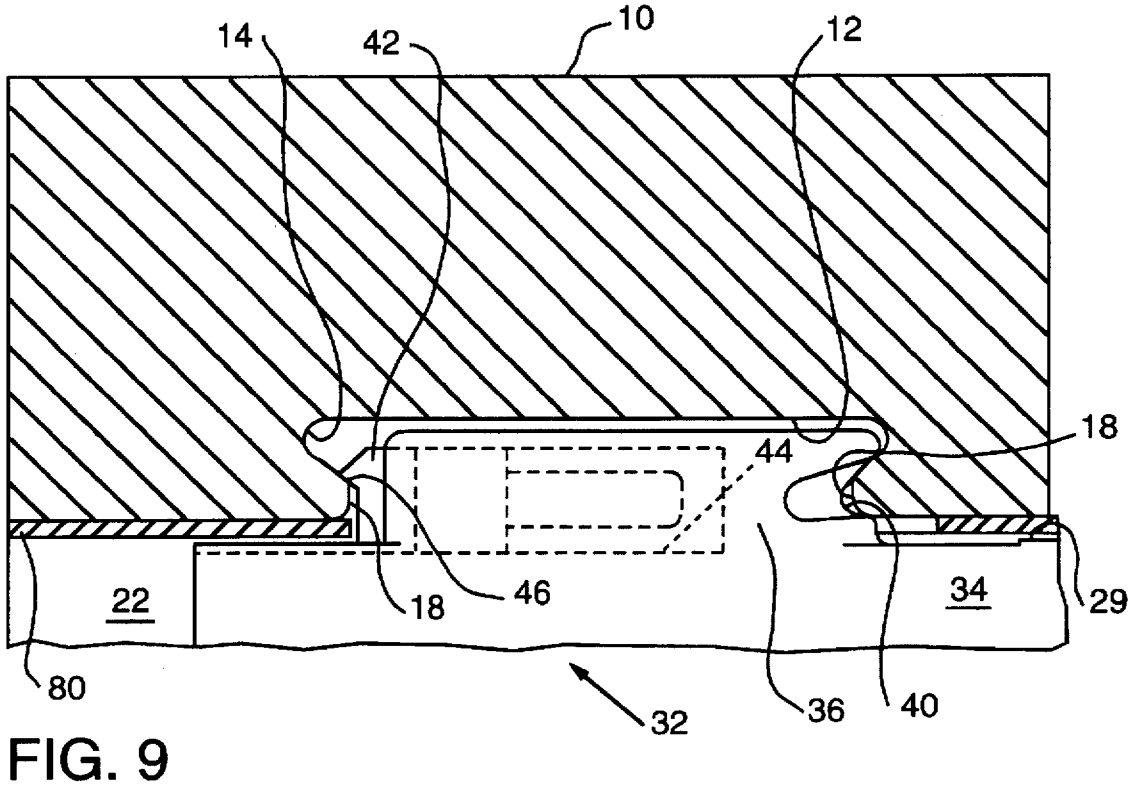
FIG. 9 is partial cross-sectional assembly view of a preferred removable jaw member of the present invention attached to a preferred movable support member of the present invention.

The jaw member 10 can be reattached to the tower 36 of the support member 32 by placing the jaw member 10 onto the tower as shown in FIG. 10. Thereafter, by moving the movable support member 32 in a direction towards the fixed jaw 60, the pin will be permitted to engage the corresponding shoulder 18 of the jaw 10 to retain it thereon. See FIG. 9. It will be appreciated that the jaw 10 is removably attached to the tower 36 by virtue of the pin 42 engaging one of the shoulders 18 in the jaw cavity 12 and the other shoulder 18 being received in the retaining groove 40. The skilled artisan will further appreciate that jaw member 10' is attached to and removed from tower 36' in a similar manner.

As can be seen in FIG. 7, the depth "K" of the cavity in the jaw member is relatively shallow due to the low profile tower 36. Preferably, the depth "K" is less than one half of the entire thickness "L" of the jaw 10 to permit a variety of different cavities (11, 11") or retaining grooves to be machined into the top surface of the jaws (10, 10'). See FIG. 1. However, the skilled artisan will appreciate that jaws (10, 10') can be fabricated in a variety of different thicknesses. For example, the present invention permits jaws that are rather thin to be used. In addition, the removable jaw member 10 may be attached to the movable support member 32 such that either end (17, 19) may be positioned adjacent to the central jaw member 60. Thus, each jaw (10, 10') may be detached and rotated 180° and thereafter reattached to the support members (32, 32') to enable different workpieces to be clamped thereby.

Figure 11:
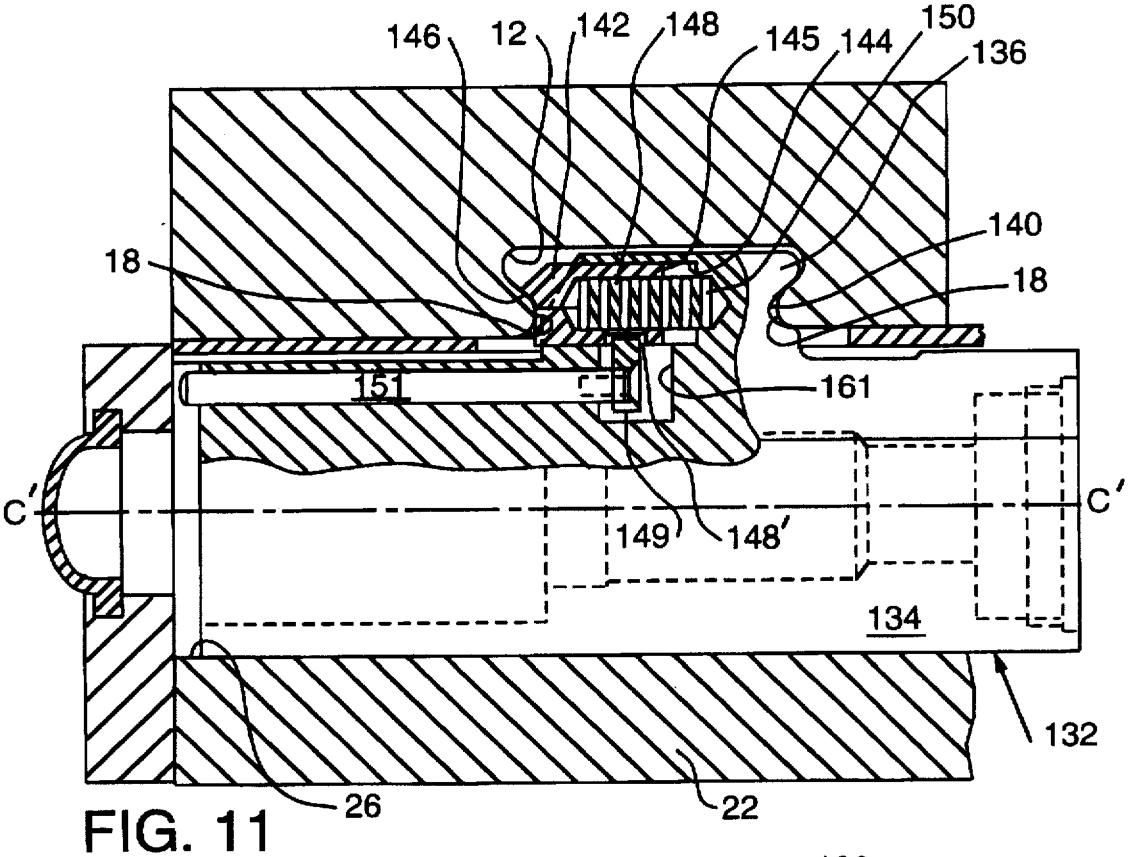
FIG. 11 is partial cross-sectional assembly view of a preferred removable jaw member of the present invention in a first position wherein it is attached to another preferred movable support member of the present invention.
Figure 12:
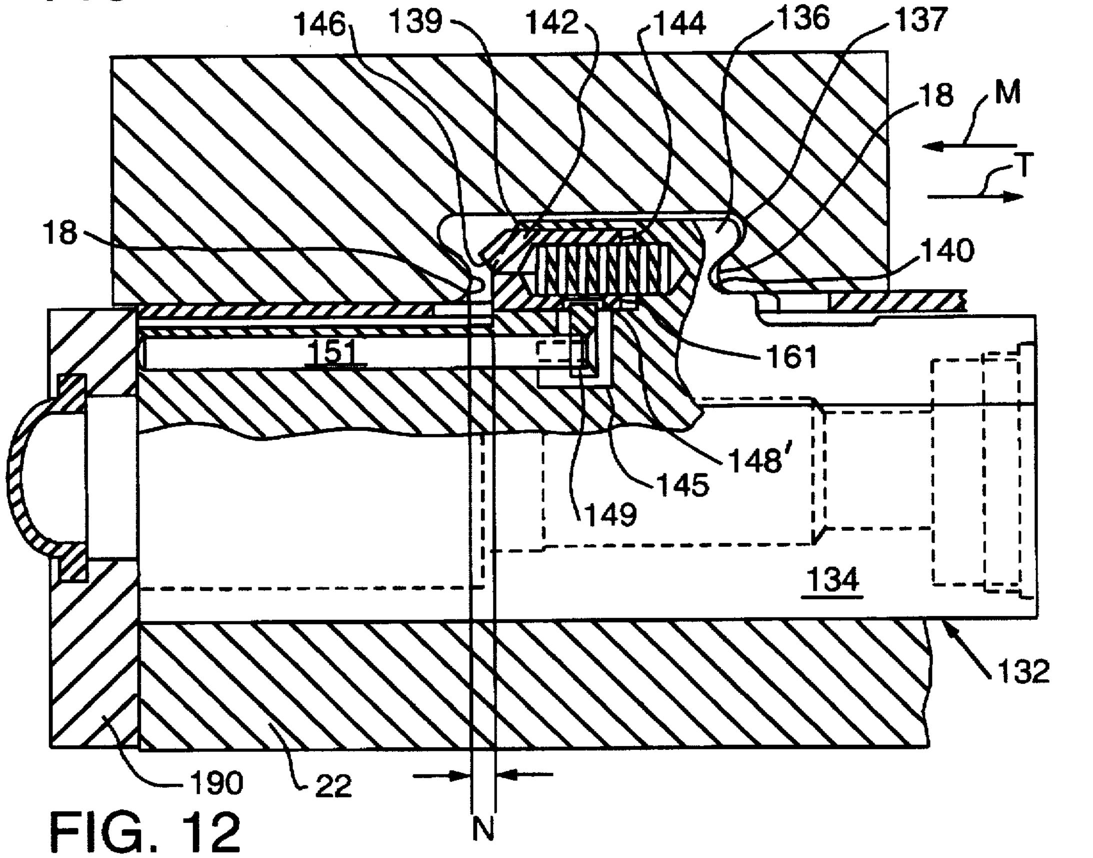
FIG. 12 is a partial cross-sectional assembly view of the preferred removable jaw member and movable support member of FIG. 11 with the retaining pins thereof biased to second disengaged positions.
Figure 13:
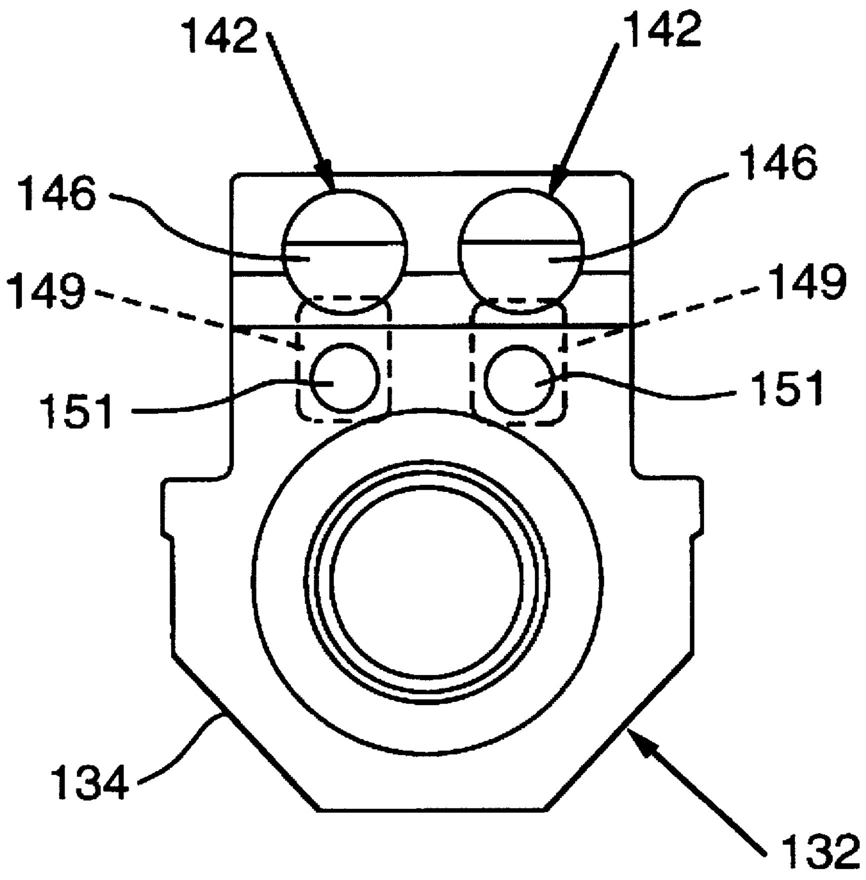
FIG. 13 is an end elevational view of the preferred movable support member depicted in FIGS. 11 and 12.

Another preferred embodiment of the present invention is illustrated in FIGS. 11–13 and is adapted to be used in connection with a workholding vise of the type described above. As can be seen from those Figures, a preferred first movable support member 132 has a longitudinally extending lower portion 134 that is adapted to be slidably received within the cavity 26 of the vise base 22. Support member 132 also has a tower portion 136 that is slidably received in the slot 26 and extends above the worksurface 29. A retaining groove, generally designated as 140, is provided in a first opposing side 137 of the tower 136 such that it extends along an axis that is substantially transverse to a longitudinal axis "C'—C'" of the first support member 132. See FIG. 11. In a preferred embodiment, the retaining groove 140 is provided at an approximate 45° angle relative to the top surface of the support member 32 or shield 80. The skilled artisan will appreciate, however, that other groove configurations may also be successfully used.

Preferably, a second opposing side 139 of the tower 136 that is opposite the end with the retaining groove 140, is provided with a pair of like-constructed retaining pins 142 that protrude therefrom. It will be appreciated, however, that other numbers of retaining pins 142, including a single retaining pin, may be successfully employed. As can be seen in FIGS. 11 and 12, pins 142 are each slidably received in corresponding longitudinal bores 144 provided in the tower 136. The axis of the bores 144 are each preferably parallel to axis "C'—C'". Pins 142 are preferably fabricated from bronze; however, pins 142 may be fabricated from a variety of other suitable materials.

As can be seen in FIGS. 11–12 , each pin 142 has a relatively flat bearing end 145 and a notched retaining end 146. Located in the bottom of each pin is an engagement groove 148' that is adapted to receive a portion of a corresponding actuator tab 149. Each actuator tab 149 is attached to an end of a corresponding longitudinally extending plunger rod 151 that is slidably supported in a longitudinally extending bore provided in the support member 132. Tabs 149 are received in a cavity 161 provided in the movable support member 132. In addition, an axial counterbore 148 is provided in the rear of each pin 142 for receiving a biasing spring 150 therein.

FIG. 12 illustrates the jaw 10 in a position wherein it can be removed from the tower 136 without the use of any additional tools. To remove the jaw 10 from the tower 136, the movable support member 132 is retracted within the cavity in a direction away from the center jaw (the direction represented by arrow "M" in FIG. 11) by rotating the screw member 50. Such movement of the movable support member 132 causes the actuation plungers to contact a stop plate 190 that is attached to the end of the vise base 22 and thereby bias their respective pins 142 into their respective bores 144. When in that "releasable" position, the jaw 10 may be easily manually removed from the tower 36 due to the clearance "N" generated between the groove and the shoulder 18 in the jaw 10. To reattach the jaw 10, the movable support member 32 is axially moved in the "T" direction to move the actuation plungers to move out of contact with the stop plate 190 thereby permitting the pins 142 to reengage the corresponding jaw shoulder 18. See FIG. 11. It will be appreciated that the jaw 10 is removably attached to the tower 136 by virtue of the pins 142 engaging one of the shoulders 18 in the jaw cavity 12 and the other shoulder 18 being received in the retaining groove 140.

Accordingly, the present invention provides solutions to the aforementioned problems associated with vise-like workholding apparatuses. The present invention provides a relatively inexpensive removable jaw for use in connection with a vise-like workholder that is relatively inexpensive to manufacture when compared to other workholder jaws. Due to the unique manner of fastening the jaw to the vise, the jaws can be easily manually detached from the vise without the use of hand tools. Furthermore, the low profile of the tower portions of the jaw support members permits cavities and grooves to be machined into the upper surface and/or ends of the jaw to enable the jaws to clamp different workpieces. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A jaw assembly for a workholding apparatus having a base with a longitudinal slot therein, comprising:

a movable support member having a lower portion operably supportable in said longitudinal slot of said base and being selectively axially movable within said base, said movable support member having an upper portion that protrudes from said slot for supporting a jaw member thereon;

jaw retaining means attached to said upper portion of said movable support member, said jaw retaining means being selectively movable between a first position wherein said jaw member is non-removably attached to said upper portion of said movable support member and a second position wherein said jaw member can be removed from said upper portion of said movable support member; and actuation means on said base for biasing said jaw retaining means to said second position when said movable support member is axially moved to a disengaged position.

2. The jaw assembly of claim 1 wherein said actuation means comprises a shield member received on said base between said base and said jaw member for preventing debris from entering said longitudinal slot, said shield member constructed to bias said jaw retaining means to said second position when said movable support member is in said disengaged position.

3. The jaw assembly of claim 1 wherein said actuation means comprises:

at least one longitudinally extending plunger rod being movably supported within said movable support member and protruding from an end of said movable support member adjacent to a stop member attached to an end of said base such that when said movable support member is axially moved to said disengaged position, each said plunger rod contacts said stop member to bias said jaw retaining means to said second position.

4. The jaw assembly of claim 1 wherein said upper portion of said movable support member has first and second opposing sides, said first opposing side having a groove therein and wherein said jaw retaining means comprises at least one jaw retaining pin movably supported in said upper portion of said movable support member and being selectively movable between said first position wherein each said jaw retaining pin protrudes outwardly from said second opposing side of said upper portion member in a transverse direction with respect to said groove and said second position wherein each said jaw retaining pin is substantially received within said upper portion of said movable support member, said jaw retaining means further comprising biasing means in said upper portion of said movable support member for biasing each said jaw retaining pin from said second side in said transverse direction and wherein said jaw member has a receiving cavity for receiving said upper portion of said movable support member therein, said receiving cavity having opposing undercut portions therein forming inwardly extending shoulder members, said shoulder members sized to be received in said groove on said upper portion of said movable support member and releasably engage said outwardly protruding portion of said jaw retaining pins such that when said jaw retaining pins are in said first position and said upper portion of said movable support member is received in said cavity, said jaw member is removably attached thereto by engagement between one of said shoulders with said groove and the other of said shoulders with said outwardly protruding portion of each said jaw retaining pin.

5. The jaw assembly of claim 4 wherein said actuation means comprises a shield member receivable on said base member between said jaw member and said base for preventing debris from entering said longitudinal slot, said shield member having a longitudinal opening therein for receiving said upper portion of said movable support member therethrough, said longitudinal opening having an actuation portion arranged to bias said jaw retaining pins to said second position when said movable support member is moved to said disengaged position.

6. The jaw assembly of claim 4 wherein said actuation means comprises:

a stop member attached to an end of said base transverse to said longitudinal slot; and a longitudinally extending plunger rod corresponding to each said jaw retaining pin and being movably supported within said movable support member and protruding from an end of said movable member adjacent to said stop member such that when said movable support member is axially moved to said disengaged position, each said plunger rod biases said corresponding jaw retaining pin to said second position.

7. A workholding apparatus comprising:

a base having a longitudinal slot therein;

at least one fixed jaw attached to said base;

at least one movable support member having a lower portion slidably received in said slot in said base for selective movement toward and away from said fixed jaw, said movable support member having an upper portion that protrudes from said slot, said upper portion having first and second opposing sides, said first opposing side having a groove therein, said movable support member having at least one jaw retaining pin movably supported therein and being selectively movable between a jaw retaining position wherein each said jaw retaining pin protrudes outwardly from said second opposing side of said upper portion in a transverse direction with respect to said groove and a jaw releasing position wherein each said jaw retaining pin is substantially received within said upper portion of said movable support member, said movable support member further having biasing means in said upper portion thereof for biasing each said jaw retaining pin to said jaw retaining position;

a movable jaw member corresponding to each said movable support member and having a receiving cavity for receiving said upper portion of said corresponding movable support member therein, said receiving cavity having opposing undercut portions therein forming inwardly extending shoulder members, said shoulder members sized to be selectively received in said groove on said upper portion of said corresponding movable support member and releasably engage said outwardly protruding portion of each said jaw retaining pin such that when said jaw retaining pins are in said jaw retaining position and said upper portion of said corresponding movable support member is received in said receiving cavity, said movable jaw member is removably attached thereto by engagement between one of said shoulders with said groove and the other of said shoulders with said outwardly protruding portion of each said jaw retaining pin;

means attached to each said movable support member for selectively moving each said movable support member toward and away from said fixed jaw member; and a shield member received on said base between said base and each said fixed and movable jaw member for preventing debris from entering said longitudinal slot, said shield member having a longitudinal opening therein corresponding to each said movable support member for receiving the upper portion thereof therethrough, each said longitudinal opening having an actuation portion arranged to bias said jaw retaining pins in said corresponding movable support member to said jaw releasing position when said corresponding movable support member is moved to a predetermined axial position within said longitudinal slot.

8. A workholding apparatus comprising:

a base having a longitudinal slot therein;

at least one fixed jaw attached to said base;

at least one movable support member having a lower portion slidably received in said slot in said base for selective movement toward and away from said fixed jaw, said movable support member having an upper portion that protrudes from said slot, said upper portion having first and second opposing sides, said first opposing side having a groove therein, said movable support member having at least one jaw retaining pin movably supported therein and being selectively movable between a jaw retaining position wherein each said jaw retaining pin protrudes outwardly from said second opposing side of said upper portion in a transverse direction with respect to said groove and a jaw releasing position wherein each said jaw retaining pin is substantially received within said upper portion of said movable support member, said movable support member further having biasing means in said upper portion thereof for biasing each said jaw retaining pin to said jaw retaining position;

a movable jaw member corresponding to each said movable support member and having a receiving cavity for receiving said upper portion of said corresponding movable support member therein, said receiving cavity having opposing undercut portions therein forming inwardly extending shoulder members, said shoulder members sized to be selectively received in said groove on said upper portion of said corresponding movable support member and releasably engage said outwardly protruding portion of each said jaw retaining pin such that when said jaw retaining pins are in said jaw retaining position and said upper portion of said corresponding movable support member is received in said cavity, said movable jaw member is removably attached thereto by engagement between one of said shoulders with said groove and the other of said shoulders with said outwardly extending portion of each said jaw retaining pin;

means attached to each said movable support member for selectively moving each said movable support member toward and away from said fixed jaw member;

a stop member attached to each end of said base transverse to said longitudinal slot; and a longitudinally extending plunger rod corresponding to each said jaw retaining pin and being movably supported within said corresponding movable support member and protruding from an end of said corresponding movable support member adjacent to a corresponding stop member such that when each said movable support member is axially moved to a predetermined disengaged position, each said plunger rod contacts said corresponding stop member to bias said corresponding jaw retaining pin to said jaw releasing position.

* * * * *

UNITED STATES PATENT AND TRADEMARK OFFICE

CERTIFICATE OF CORRECTION

PATENT NO. : 5,720,476
DATED : February 24, 1998
INVENTOR(S) : Swann, George R.

It is certified that error appears in the above-identified patent and that said Letters Patent is hereby corrected as shown below:

Column 1,
Line 32, delete “swarm” and replace therewith -- Swann --.

Column 3,
Line 3, delete “swarm” and replace therewith -- Swann –.

Signed and Sealed this

Twenty-fourth Day of September, 2002

*Attest:*

JAMES E. ROGAN

*Attesting Officer*

*Director of the United States Patent and Trademark Office*